United States Patent [19]

Spivey et al.

[11] Patent Number: 5,040,931
[45] Date of Patent: Aug. 20, 1991

[54] COUPLING MECHANISM

[75] Inventors: Martin P. Spivey, Maldon; Stephen J. Trull, Wickwar; David R. McMurtry, Wotton-Under-Edge, all of United Kingdom

[73] Assignee: Renishaw plc, Gloucestershire, England

[21] Appl. No.: 495,751

[22] Filed: Mar. 19, 1990

[30] Foreign Application Priority Data

Mar. 31, 1989 [GB] United Kingdom ............ 8907264.9
May 16, 1989 [GB] United Kingdom ............ 8911198.3
Oct. 21, 1989 [GB] United Kingdom ............ 8923747.3

[51] Int. Cl.⁵ .......................................... B23B 31/10
[52] U.S. Cl. ................................ 408/185; 408/181;
   279/6; 279/83; 82/158; 33/572; 33/559
[58] Field of Search ............... 279/1 E, 1 L, 83, 89,
   279/1 TS, 32, 6, 1 J; 408/239 R, 239 A, 182,
   183, 185, 181, 16, 75, 146, 150, 153; 409/234;
   82/158, 160; 403/259–261, 362; 33/556, 559,
   572, 503, 644, 626

[56] References Cited

U.S. PATENT DOCUMENTS

| 2,435,396 | 2/1948 | Koch | 279/6 |
| 3,178,192 | 4/1965 | Sampson | 279/6 |
| 3,767,218 | 10/1973 | Linthicum et al. | 279/75 |
| 4,510,693 | 4/1985 | Cusack | 33/561 |
| 4,634,324 | 1/1987 | Eckle et al. | 408/181 X |
| 4,772,163 | 9/1988 | Scheer et al. | 408/239 R X |
| 4,776,734 | 10/1988 | Buettiker et al. | 409/234 |
| 4,779,319 | 10/1988 | Juengel | 408/16 X |
| 4,797,041 | 1/1989 | Glaser | 409/232 |
| 4,813,831 | 3/1989 | Reinauer | |
| 4,829,677 | 5/1989 | Yuzuru | 33/503 X |
| 4,915,523 | 4/1990 | Andersson | 82/160 X |
| 4,964,221 | 10/1990 | Breyer et al. | 33/503 |
| 4,991,306 | 2/1991 | Raiha | 408/75 X |

FOREIGN PATENT DOCUMENTS

| 0164582 | 5/1985 | European Pat. Off. . |
| 0125529 | 9/1987 | European Pat. Off. . |
| 0275441 | 12/1987 | European Pat. Off. . |
| 0281760 | 2/1988 | European Pat. Off. . |
| 292721 | 11/1988 | European Pat. Off. ............ 279/1 L |
| 3108439 | 11/1982 | Fed. Rep. of Germany . |
| 3401200 | 7/1985 | Fed. Rep. of Germany ... 408/239 A |
| 8633959.1 | 12/1986 | Fed. Rep. of Germany . |
| 2101018 | 1/1983 | United Kingdom ............... 408/181 |
| 2092034 | 4/1985 | United Kingdom . |
| 2212745 | 2/1989 | United Kingdom . |

*Primary Examiner*—Larry I. Schwartz
*Assistant Examiner*—Robert Schultz
*Attorney, Agent, or Firm*—Oliff & Berridge

[57] ABSTRACT

A mechanism for clamping a tool (e.g. a probe) and a shank together comprises a clamping pin (144), which bears against an annular lip (142) in the rear face of the probe. A shaft (148) of the pin (144) extends into the shank (150), and two diametrically opposite, radially extending clamping bolts (160) supported by the shank (150), bears against a frusto-conical clamping surface (158). The action of the bolts (160) on the surfaces (158) urges the probe and shank together. The probe and shank are adjusted laterally relative to each other by four adjusting bolts (166) supported in the annular lip (142) which bear against a flange (152). The flange (152) is provided on the shank (150) and extends into the probe (140).

6 Claims, 4 Drawing Sheets

COUPLING MECHANISM

BACKGROUND OF THE INVENTION

The present invention relates to a coupling mechanism, which may be used for example, in coupling a tool to a shank for supporting the tool in a head of a coordinate positioning machine, e.g. a machine tool or coordinate measuring machine.

FIELD OF THE INVENTION

It is known to releasably couple a tool such as a probe or cutting tool (e.g. a boring bar) to a shank, which supports the tool in a machine tool. This enables replacement of a faulty, worn, or broken boring bar for example without replacement of the shank as well, and thus is more cost effective. However, releasable coupling mechanisms have the disadvantage that, during coupling the axis of the too may be displaced by a small distance from the axis of the shank as a result of lateral forces in the coupling mechanism. This source of error is undesirable, and particularly so where the device to be coupled to the machine is a touch or other probe.

DESCRIPTION OF PRIOR ART

It is known, for example from EP 0125529. to fix a tool holder to the spindle of a machine tool, by mounting a clamping pin having a conical recess at one end in a transverse bore provided in a shaft on the tool holder. The shaft (and clamping pin) are then inserted into a bore in the spindle, and a clamping screw extending radially into the bore is brought into engagement with the conical recess, to urge the tool holder and spindle against each other. It is also known, from U.S. Pat. No. 4,776,734 to attach a tool holder to a spindle fixture by axially extending screws. The axial alignment of the spindle fixture and tool holder is adjusted by a radially extending screw, carried in a rotatable ring provided on the spindle fixture, which bears against the tool holder.

SUMMARY OF THE INVENTION

The present invention provides a mechanism for clamping a tool to a shank engageable with a spindle of a machine tool, the shank having an axis, the mechanism comprising:

clamping means having:

a) means provided on one of the tool and shank for applying a force, radial with respect to the axis of the shank, on the other of the tool and shank;

b) means provided on the other of the tool and shank, and operable by the radial force for producing a clamping force parallel to the axis to clamp the tool and shank together; and adjusting means, distinct from the clamping means and provided on one of the tool and the shank for aligning, the tool and shank relative to each other in a first direction transverse to said axis, and in a second direction transverse to both said first direction and said axis.

A second aspect of the present invention provides a coupling mechanism for first and second parts of a tool comprising:

a projection provided on the first part and a recess provided on the second part for receiving the projection;

clamping means provided in the body of the second part for applying a force to the projection;

means provided on the projection for causing the force to urge the first and second parts together, thereby providing a resultant clamping force for the first and second parts; and adjusting means, distinct from said clamping means and provided in the body of the second part, for applying an adjusting force to the projection in a direction substantially perpendicular to the resultant clamping force.

BRIEF DESCRIPTION OF THE DRAWINGS

Embodiments of the invention will now be described, by way of example, and with reference to the accompanying drawings in which.

DESCRIPTION OF THE PREFERRED EMBODIMENTS

Figure 1:
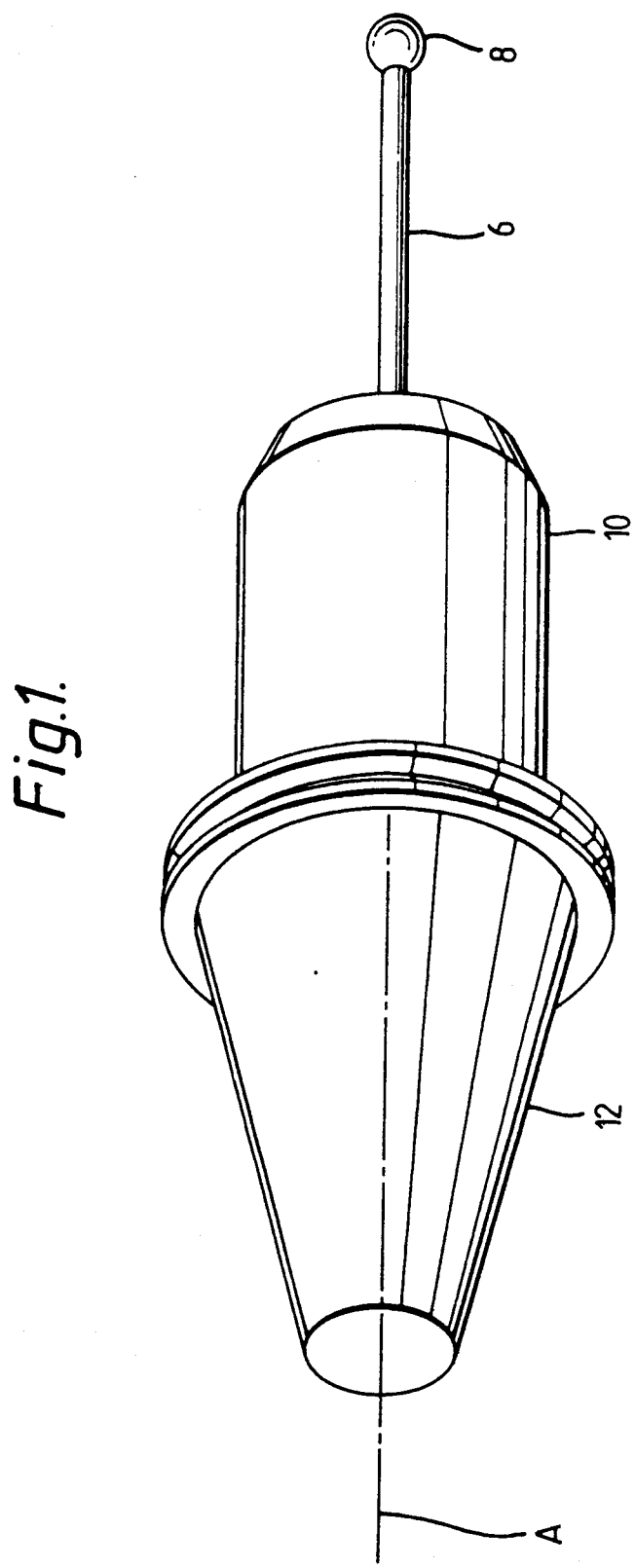
FIG. 1 shows a perspective view of a touch probe attached to a shank.
Figure 2:
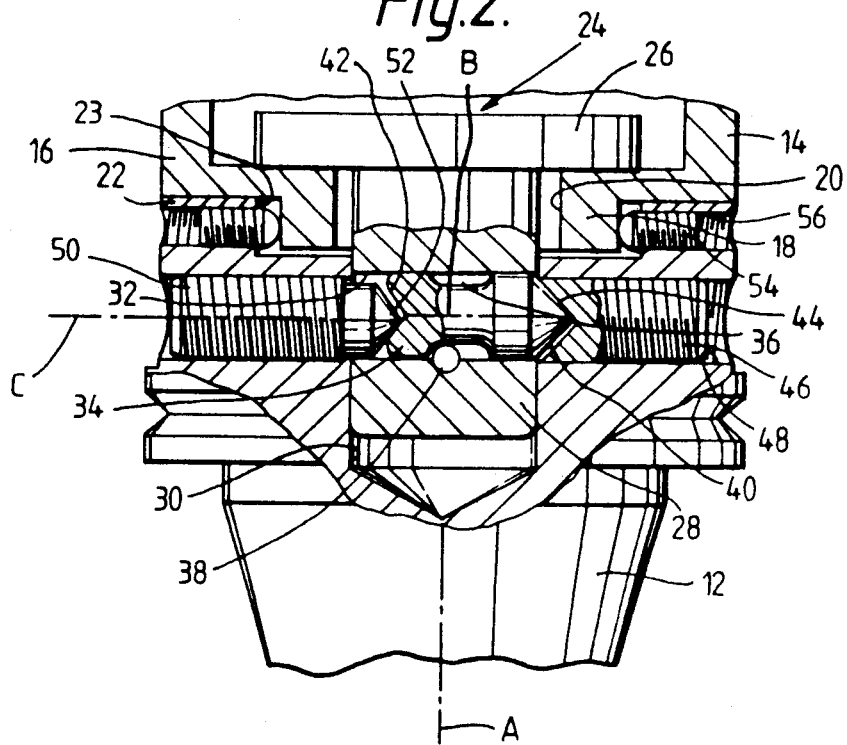
FIG. 2 shows a section through a first embodiment of a coupling mechanism according to the present invention.

Referring to FIGS. 1 and 2, a touch probe 10 carries a stylus 6 which terminates in a spherical measuring tip 8 for contacting a workpiece. The probe 10 is releasably coupled to a shank 12 which supports the probe in a head of a machine tool (not shown). The probe 10 has a cylindrical housing 14 which terminates at the end of the probe adjacent the shank in a radially extending annular lip 16 having an axially extending flange 18 defining an aperture 20. The end of the shank 12 adjacent the probe 10 has a radially extending annular wall 22, which defines an aperture 23 and, (when the probe and shank are coupled together) receives the flange 18 with a clearance therebetween.

The probe 10 and shank 12 are coupled by means of a clamping mechanism which comprises clamping pin 24, having a head 26 and a shaft 28. The pin 24 is movably engaged with the probe 10 by the head 26 which lies inside the probe housing 14 and bears against the lip 16. The shaft 28 of the bolt projects through the aperture 20 into a cylindrical bore 30 in the shank 12. The cylindrical bore 30 lies coaxially with the axis A of the shank 12. The shaft 28 of the bolt has a diametric bore 32, and a substantially cylindrical clamping element 34 is supported in the bore 32 for radial movement with respect to the axis A. The clamping element 34 is provided with a circumferential channel 36, and a ball bearing 38 embedded in the surface of the bore 32 rests in the annular space defined by the surface of the bore 32 and the channel 36, thereby to retain the clamping element 34 within the bore 32. The clamping element 34 has, at one end, an outwardly projecting conical clamping surface 40, and at the other end an inwardly projecting conical clamping surface 42. The surface 40 engages an inwardly projecting conical surface 44 in the end of a fixed clamping bolt 46 which lies in a diametrically extending screw threaded bore 48 in the body of the shank 12. Moveable clamping bolt 50 also lies in the screw threaded bore 48, and has an outwardly projecting conical surface 52 which engages the inwardly projecting surface 42 of the element 34. The axis B of the element 34 lies closer to the wall 16 of the probe 10, than the axis C of the moveable clamping bolt.

To clamp the probe 10 and shank 12 together, the moveable clamping bolt 50 is driven down the bore 48 toward the axis A of the shank 12, until the outwardly projecting surface 52 of the clamping bolt 50 comes into contact with the inwardly projecting conical surface 42 of the clamping element 34. Initially, the element 34 will be driven diametrically toward the fixed clamping bolt 46. However, once clamping bolt 46 has arrested the diametric movement of element 34, the action of outwardly projecting conical surface 52 on the inwardly projecting conical surface 42 will result in an axial force acting on the shaft 28 of the pin 24 in the direction of shank 12. This will force the head 26 against the inner surface of lip 16, and will clamp the probe and shank together.

Four adjusting bolts 54 are supported by the shank and project radially through screw threaded bores 56 in the annular wall 22. The bolts 54 bear against the outside of the flange 18, and adjustment of these bolts 54 causes movement of the probe housing 14 relative to the shank 12 in a plane substantially orthogonal to the axis A. (The flange 18 thus provides a shaft fixedly engaged with the probe against which the adjusting bolts may bear). When clamping the probe 10 and shank 12 together, the preferred procedure is to tighten moveable clamping bolt 50 until the clamping pin 24 retains the probe 10 and shank 12 together with a pre-determined force, which is not sufficiently large to prevent relative lateral movement of probe 10 and shank 12, the relative position of the probe 10 and shank 12 is then adjusted with adjusting bolts 54, until the centre of the measuring tip 8 lies on the shank axis A. The adjustable clamping screw 50 is then tightened further until the probe 10 and shank 12 are retained together with the desired force.

Figure 3:
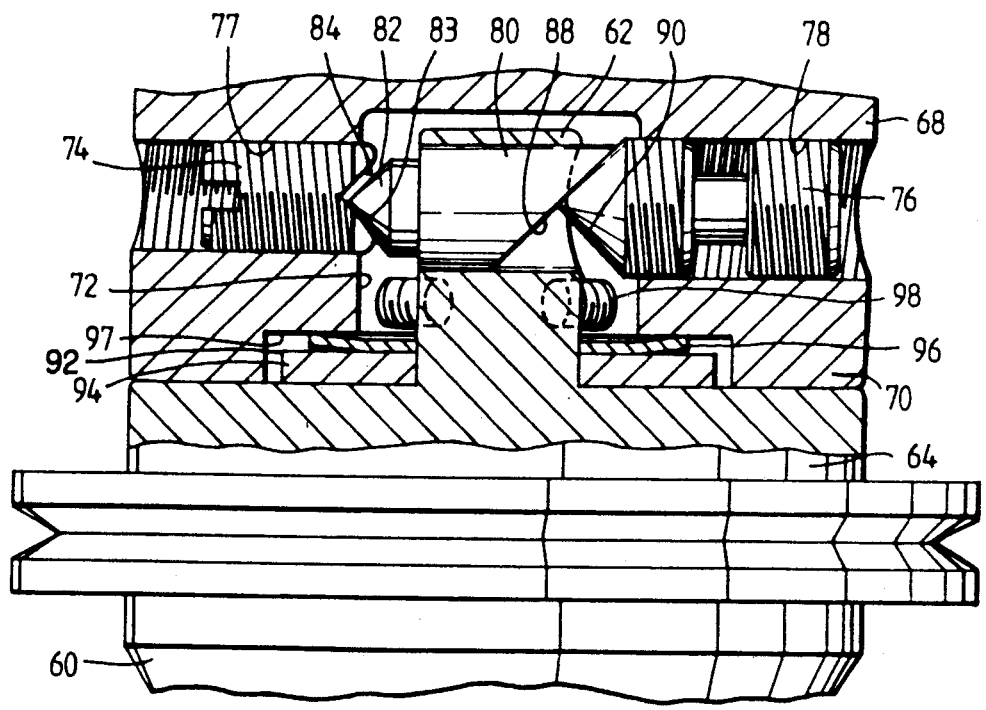
FIG. 3 shows a section through a second embodiment of a coupling mechanism according to the present invention.

A second embodiment of a clamping assembly according to the present invention will now be described with reference to FIG. 3. A shank 60 has a shaft 62 formed integrally with the shank at one end. A substantially cylindrical probe body 68 terminates at one end in an annular flange 70, defining an axial bore 72. When the shank and probe body are engaged the shaft 62 projects into the bore 72.

As with the first embodiment, fixed and moveable clamping bolts 74 and 76 respectively, lie in screw threaded bores 77 and 78 respectively. A clamping element 80 is supported in a diametric bore in the shaft 62 for radial movement relative to the shaft 62, and one end of the clamping element 80 has an outwardly projecting wedge 82 having two inclined plane faces 83 which engage corresponding inwardly projecting plane surfaces 84 in the end of fixed clamping bolt 74. The other end of clamping element 80 terminates in an inclined planar surface 88. Moveable clamping bolt 76 has an outwardly projecting conical surface 90, which, as the bolt 76 is driven inwardly down the bore, engages the surface 88. As described previously, the clamping element 80 will initially move radially relative to the axis of shaft 62 until its motion has been arrested by virtue of its engagement with fixed clamping bolt 74. At this point, the action of moveable clamping bolt 76 on inclined surface 88 will draw the shaft 62 into the bore 72, thereby clamping the shank 60 and the probe body 68 together.

In order to damp any vibration between the shank 60 and the probe body 68, a spring mechanism 92 is provided. The mechanism 92 comprises a supporting ring 94 which lies around the circumference of shaft 62, and a belville washer 96 attached to the supporting ring 94. The belville washer 96 bears against a groove 97 in the inner surface of annular wall 70.

Four adjusting bolts 98 are supported in radially extending screw threaded bores (not shown) in the probe 68. The screws 98 bear against the shaft 62 and enable lateral adjustment of the shank relative to the probe 68. The clamping procedure is as described in the first embodiment.

A third embodiment of the present invention will now be described, with reference to FIG. 4.

Figure 4:
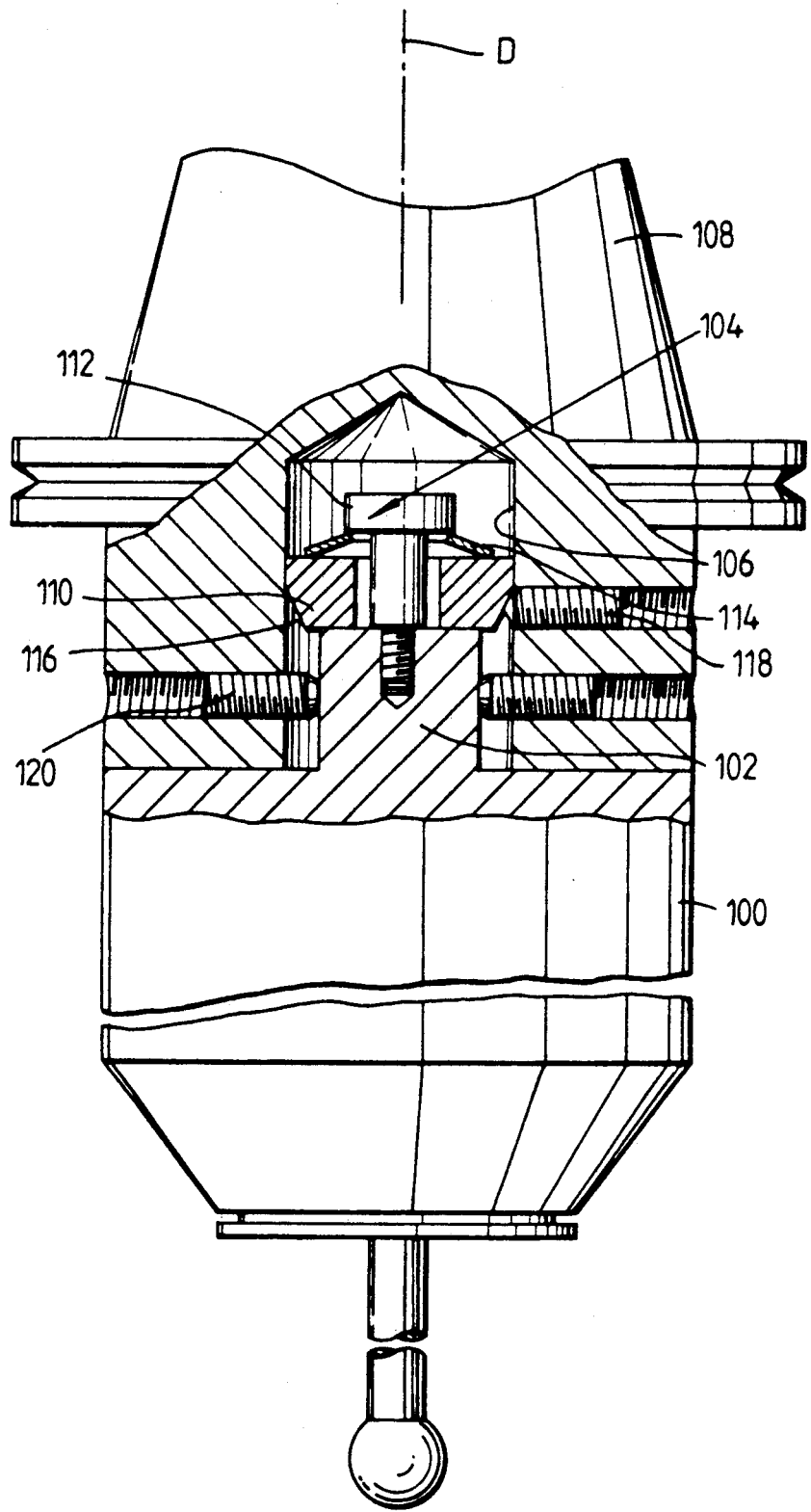
FIG. 4 shows a section through a third type of coupling mechanism according to the present invention.

Referring now to FIG. 4 a probe 100 has, at its rear face a shaft 102 into which a retaining pin 104 is embedded. Both the shaft 102 and the pin 104 lie inside the retaining bore 106 in the taper shank 108. The retaining pin 104 is sleeved by a clamping element in the form of a cylindrical collar 110; the collar 110 sleeves the pin 104 sufficiently loosely to allow relative movement of the pin 104 and collar 110 perpendicular to the axis D of shank 108. The head 112 of the retaining pin 104 bears against the collar 110 via a Belleville washer 114. The collar 110 has a conical side face 116 and the largest diameter edge of the collar 110 fits closely into bore 106. The entire assembly of shaft 102, pin 104, collar 110 and washer 114 comprises a projection which lies inside the recess (in this case, a bore 106) provided in the shank 108.

A clamping bolt 118 projects into the retaining bore 106, in a direction radial to the axis D. The end face of the clamping bolt 118 is conical, and bears against the concial face 116 of the collar 110. Since the largest diameter of the collar 110 is adjacent the head 112 of the pin 104, inward radial movement of the clamping bolt 118 will cause the collar 110 to move away from the body of the probe 100, and therefore bear (via the Belleville washer 114) more strongly against the head 112 of the pin 104. Thus, force applied to the collar by inward radial movement of the bolt 118, produces a resultant clamping force which clamps the taper shank 108 and the probe 100 together.

Radial adjustment of the relative alignment of the probe 100 and taper shank 108 is accomplished by means of four adjusting bolts 120, each of which is supported in the body of the taper shank 108 and extends radially into retaining bore 106 to bear against the shaft 102.

A coupling, and adjustment operation is thus performed as follows: the clamping bolt 118 is first tightened to cause the probe 100 to bear against the shank 108 with sufficient force to provide friction against relative radial movement of the two parts. The relative radial positions of probe 100 and shank 108 are then adjusted using the four adjusting bolts 120. Once this has been completed, the clamping bolt 118 is fully tightened, thus drawing the probe 100 more firmly against the shank 108, without destroying the recently adjusted relative alignment of the two parts.

Figure 5:
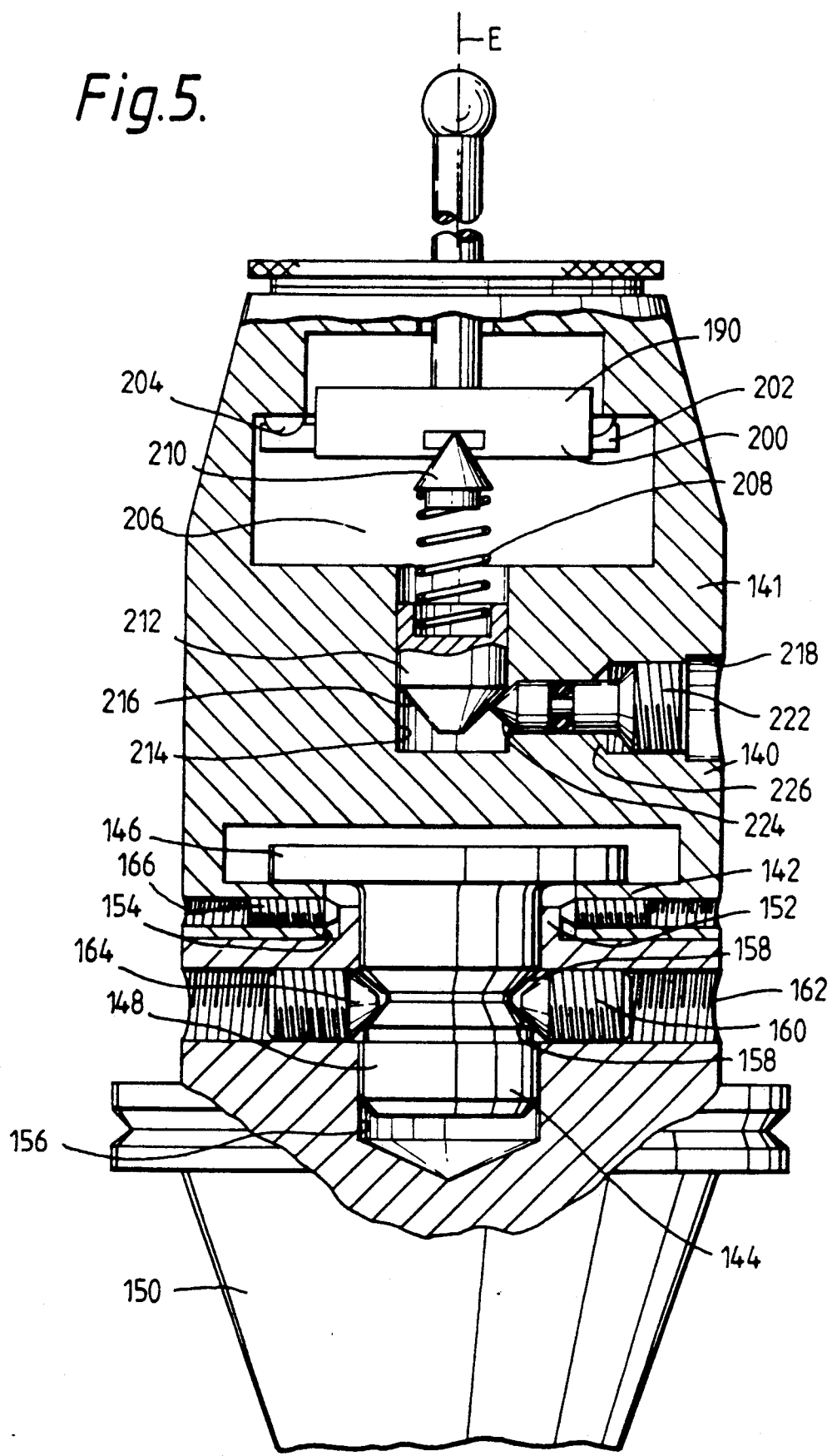
FIG. 5 shows a section through a preferred coupling mechanism of the present invention.

A fourth embodiment of the present invention will now be described with reference to FIG. 5. A probe 140 terminates at its rear end in an annular lip 142. A clamping pin 144, having a head 146 and a shaft 148 is moveably engaged with the probe 140 by virtue of its contact between the head 146 and the lip 142. A shank 150 has a annular flange 152 which extends into a hole 154 defined by the annular lip 142. The flange 152 sleeves the shaft 148 of the pin 144, which extends into a bore 156 in the shank 150. The shaft 148 has two mutually convergent frusto-conical faces 158, and a pair of clamping bolts 160, provided in diametrically extending bores 162 each have a conical face 164, which bears against the frusto-conical surface remote from the probe 140. Inward radial movement of one, or both the clamping bolts 160 will result in a force on the shaft 148 in an axial direction, causing the head 146 of the pin 144 to bear against the annular lip 142, and urge the probe 140 and the shank 150 together. Four radially extending, and equispaced adjusting bolts 166 extend in the annular lip 142, and bear against the flange 152 of the shank 150, which thus provides a fixed shaft against which the adjusting bolts may bear. The method of adjustment using this embodiment of the present invention is as described for the previous embodiments.

As stated earlier, the provision of three or more adjusting screws prevents relative movement of the tool and the shank (radially with respect to each other) when the tool and the shank are being clamped axially. Moreover, if the tool is to be used in conjunction with a tool change apparatus which grasps the shank to remove the tool from a magazine and insert it into a spindle, then the continual jarring of the tool during changing may cause misalignment between the tool and the shank. The provision of three or more radially extending adjusting screws helps to reduce this undesirable effect.

It is not essential that either of the shafts (i.e. the fixed shafts provided by the probe and shank as appropriate, and the moveable shafts provided by the clamping pins) be cylindrical. For example, it may be desirable to provide square shafts, or triangular shafts (depending upon the number of adjusting, and clamping bolts employed).

Typically, the touch probe illustrated in the embodiments of the present invention will be a touch trigger probe or an analogue touch probe. In either case, the stylus of the probe is supported on a stylus carrier, which is usually urged into a rest position with respect to the housing of the probe by a spring. The force required to displace the stylus from the said rest position is thus dependent directly upon the force with which the spring urges the stylus carrier into its rest position. It is ocassionally desirable to adjust the spring force. However adjustment of the spring force in existing touch probes is possible only by disengaging the probe from the shank. A third aspect of the present invention therefore provides means for adjusting the spring force of a touch probe while the probe is in situ (e.g. connected to a shank).

According to a third aspect of the present invention there is provided a touch probe having:
 a housing;
 a stylus carrier supported relative to the housing in a rest position;
 a spring, extending in a first direction and having one end bearing against the stylus carrier, and another end bearing against an abutment; and
 means actuable from a second direction lateral to the first direction, for adjusting the position of the abutment in the first direction.

Preferably, the abutment will comprise a clamping shuttle having an angled surface, so that a lateral adjusting force applied to the angled surface will result in movement of the clamping shuttle perpendicular to the applied force thus enabling adjustment of the position of the clamping shuttle in the first direction; such adjustment will cause a change in the degree of spring deformation and thus a change in the spring force.

The adjusting force will preferably be applied by a screw, having an angled surface at its bearing end for bearing against the angled surface of the clamping shuttle.

An example of such a touch probe will now be described with further reference to FIG. 5.

The stylus is supported in probe housing 141 on a stylus carrier 190, comprising a base 200, supported by three cylindrical rollers 202 which extend equidistant to each other and radially to the axis E. When the stylus carrier is in its rest position, each of the rollers 202 seats in a cleft defined by an adjacent pair of steel balls 204 (of which only one is shown since the figure shows the stylus carrier in section). This kinematic arrangement is well-known, e.g. from U.S. Pat. No. 4,153,998, and therefore need not be described in more detail.

The stylus carrier is urged into its kinematic rest position by a spring mechanism 206 comprising a spring 208 which bears against the base 200 at one end via a conical member 210. The other end of the spring 208 bears against an abutment in the form of a cylindrical clamping shuttle 212 which is constrained to move in a bore 214. The free end of the clamping shuttle 212 terminates in a conical face 216. A radially extending bore 218 extends from the outer surface of the housing to the bore 214. The outer part of the radial bore 218 has a screw threaded part 220 in which a radial adjusting screw 222 sits. The adjusting screw 222 has at its inner end in a conical face 224, which bears against the conical face 216 of the clamping shuttle 212. Thus, adjustment of the radial adjusting screw 222 causes movement of the clamping shuttle 212 along the bore 214, causing a change in the deformation of the spring 208 and thereby causing a change in the spring force which urges the stylus carrier into its kinematic rest position. The extent of the inward radial movement of the radial adjusting screw 222 is constrained by the countersunk seat 226.

We claim:

1. An apparatus for use in a coordinate positioning machine, said apparatus comprising a tool and a shank, said shank retaining the tool in a spindle of the coordinate positioning machine, the tool and shank being clamped by a clamping mechanism, said apparatus comprising:
 a bore provided in one of the tool and shank, the bore defining an axis;
 a shaft provided on the other of the tool and shank, the shaft projecting into the bore and being movable in said bore in a direction transverse to said axis;
 a clamping element, supported on an end of the shaft for movement relative to the shaft in a direction transverse to said axis, the clamping element having a clamping surface inclined at an angle to said axis;
 means for providing sliding engagement of the clamping element with the inside of the bore, thereby to enable movement of said clamping element in said bore in an axial direction, and to prevent movement of said clamping element in said bore in a direction transverse to said axis;
 means provided on said one of the tool and shank for applying a force to said clamping surface in a direction transverse to said axis thereby to generate a clamping force acting substantially parallel to said axis for clamping said tool to said shank; and means for adjusting the alignment of the tool and shank in a direction transverse to said clamping force.

2. The apparatus according to claim 1, comprising a retaining pin connected to the end of the shaft, the retaining pin extending through an aperture provided in the clamping element, wherein said aperture is sufficiently large to allow movement of the clamping element relative to the retaining pin in a direction transverse to said axis.

3. The apparatus according to claim 1, wherein said bore has a cylindrical cross-section and the clamping element has a cylindrical outer surface which contacts the bore, thereby to provide said sliding engagement.

4. The apparatus according to claim 1, further comprising means for resiliently urging the clamping element into contact with the end of the shaft.

5. The apparatus according to claim 1, comprising a plurality of adjusting bolts, provided on said one of the tool and shank, for bearing against said shaft.

6. The apparatus according to claim 1, comprising a clamping bolt provided on said one of the tool and shank, extending transversely to said axis and bearing against said clamping surface.

* * * * *